US011025755B2

(12) United States Patent
Kim et al.

(10) Patent No.: US 11,025,755 B2
(45) Date of Patent: Jun. 1, 2021

(54) METHOD AND DEVICE FOR SUPPORTING STREAMING SERVICE

(71) Applicant: Samsung Electronics Co., Ltd., Suwon-si (KR)

(72) Inventors: Jin-Hyoung Kim, Seongnam-si (KR); Jiangwei Xu, Suwon-si (KR); Hyun-Joo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/339,854

(22) PCT Filed: Sep. 29, 2017

(86) PCT No.: PCT/KR2017/010945
§ 371 (c)(1),
(2) Date: Apr. 5, 2019

(87) PCT Pub. No.: WO2018/066920
PCT Pub. Date: Apr. 12, 2018

(65) Prior Publication Data
US 2019/0306280 A1    Oct. 3, 2019

(30) Foreign Application Priority Data
Oct. 6, 2016    (KR) .......................... 10-2016-0128956

(51) Int. Cl.
*H04L 29/06*    (2006.01)
*H04L 29/08*    (2006.01)

(52) U.S. Cl.
CPC ............ *H04L 69/161* (2013.01); *H04L 29/06* (2013.01); *H04L 65/4084* (2013.01); *H04L 65/602* (2013.01); *H04L 67/2804* (2013.01)

(58) Field of Classification Search
CPC ... H04L 69/161; H04L 29/06; H04L 65/4084; H04L 65/602; H04L 67/2804; H04L 69/16; H04L 69/163; H04L 69/166
See application file for complete search history.

(56) References Cited

U.S. PATENT DOCUMENTS 10,165,311 B2    12/2018  Lee
2009/0046717 A1*   2/2009  Li ......................... H04L 69/166
                                                           370/392
(Continued)

FOREIGN PATENT DOCUMENTS

EP         1395014 A1      3/2004
KR    10-2012-0041095 A    4/2012
(Continued)

OTHER PUBLICATIONS

International Search Report dated Jan. 4, 2018 in connection with International Patent Application No. PCT/KR2017/010945, 2 pages.
(Continued)

*Primary Examiner* — Wing F Chan
*Assistant Examiner* — Billy H Ng

(57) ABSTRACT

Disclosed is a 5G or pre-5G communication system for supporting a data transmission rate higher than that of a 4G communication system such as LTE. A method for supporting a streaming service of a terminal, according to the present disclosure, comprises the steps of: requesting a streaming service from a server; receiving, from the server, metadata associated with the streaming service; and receiving predetermined configuration information and the streaming service, wherein the predetermined configuration information is included in a transmission control protocol (TCP) option.

16 Claims, 12 Drawing Sheets

(56) References Cited

U.S. PATENT DOCUMENTS

| | | | |
|---|---|---|---|
| 2009/0094374 A1* | 4/2009 | Lam | H04N 21/654 |
| | | | 709/231 |
| 2012/0221681 A1* | 8/2012 | Yuan | H04N 21/47202 |
| | | | 709/217 |
| 2013/0086275 A1 | 4/2013 | Melnyk et al. | |
| 2013/0185399 A1 | 7/2013 | Appleby et al. | |
| 2013/0282871 A1 | 10/2013 | Jung et al. | |
| 2015/0264096 A1 | 9/2015 | Swaminathan et al. | |
| 2016/0198012 A1* | 7/2016 | Fablet | H04L 67/26 |
| | | | 709/231 |

FOREIGN PATENT DOCUMENTS

| | | |
|---|---|---|
| KR | 10-2015-0138774 A | 12/2015 |
| WO | 2015110168 A1 | 7/2015 |
| WO | 2016/129964 A1 | 8/2016 |

OTHER PUBLICATIONS

Written Opinion of the International Searching Authority dated Jan. 4, 2018 in connection with International Patent Application No. PCT/KR2017/010945, 6 pages.

European Patent Office, "Supplementary European Search Report," Application No. EP17858714.3, dated Jun. 26, 2019, 6 pages.

\* cited by examiner

METHOD AND DEVICE FOR SUPPORTING STREAMING SERVICE

CROSS-REFERENCE TO RELATED APPLICATIONS

This application is a 371 of International Application No. PCT/KR2017/010945 filed on Sep. 29, 2017, which claims priority to Korean Patent Application No. 10-2016-0128956 filed on Oct. 6, 2016, the disclosures of which are herein incorporated by reference in their entirety.

BACKGROUND

1. Field

The present disclosure relates to a method and apparatus for supporting a streaming service by using a transmission control protocol (TCP) option.

2. Description of Related Art

To satisfy the demands for wireless data traffic, which have been increasing since the commercialization of a 4$^{th}$ generation (4G) communication system, efforts have been made to develop a 5$^{th}$ generation (5G) or pre-5G communication system. That's why the 5G or pre-5G communication system is called a beyond 4G or post long term evolution (LTE) system.

To achieve high data rates, deployment of the 5G communication system in an ultra-high frequency (mmWave) band (for example, 60 GHz) is under consideration. Techniques including beamforming, massive multiple input multiple output (MIMO), full dimensional MIMO (FD-MIMO), array antenna, analog beamforming, and large scale antenna have been discussed for the 5G communication system in order to mitigate the path loss of waves and increase the propagation distance of waves in the ultra-high frequency band.

Further, for system network improvement, technologies such as evolved small cell, advanced small cell, cloud radio access network (RAN), ultra-dense network, device-to-device (D2D) communication, wireless backhaul, moving network, cooperative communication, coordinated multi-point (CoMP), and received interference cancellation are under development in the 5G communication system.

Besides, hybrid FSH and QAM modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes, have been developed in the 5G communication system.

There are three types of schemes for supporting a streaming service: progressive download, real time streaming protocol/real time messaging protocol (RTSP/RTMP) streaming, and adaptive hyper-text transfer protocol (HTTP) streaming.

In the progressive download scheme, a user accesses a file through a uniform resource locator (URL), downloads the file, and reproduces the downloaded file. As far as the transmission rate of the network is high, this scheme performs well because no play takes place until a certain amount of data is downloaded. Otherwise, play may be interrupted. Another shortcoming of progressive download lies in that a user is not allowed to adjust the image quality of a video during play.

In RTSP/RTMP streaming, only a video frame that a user is currently viewing is received and played, without pre-downloading of a to-be-played video. RTSP/RTMP streaming requires a special Web server. The resulting need for physical hardware and additional software causes additional cost and increases management complexity. Nonetheless, RTSP/RTMP streaming advantageously enables normal play even though a user changes video quality during play.

SUMMARY

The present disclosure provides a method and apparatus for supporting a streaming service.

According to the present disclosure, when a streaming service is provided, a plurality of signaling transmissions and reception may be skipped between a server and a client.

The present disclosure provides a live streaming service by transmission control protocol (TCP) and hypertext transfer protocol (HTTP).

According to the present disclosure, a method of supporting a streaming service by a terminal includes requesting a streaming service to a server, receiving metadata related to the streaming service from the server, and receiving information for the streaming service based on a first bit rate. The configuration information on the first bit rate is included in a transmission control protocol (TCP) option information.

According to the present disclosure, a method of supporting a streaming service by a server includes receiving a request for a streaming service from a terminal, transmitting metadata related to the streaming service to the terminal, and transmitting information for the streaming service based on a first bit rate. The configuration information on the first bit rate is included in a TCP option information.

According to the present disclosure, a terminal for supporting a streaming service includes a transceiver, and a processor. The processor is configured to request a streaming service to a server, receive metadata related to the streaming service from the server, and receive information for the streaming service based on a first bit rate. The configuration information on the first bit rate is included in a TCP option information.

According to the present disclosure, a server for supporting a streaming service includes a transceiver, and a processor. The processor is configured to receive a request for a streaming service from a terminal, transmit metadata related to the streaming service to the terminal, and transmit information for the streaming service based on a first bit rate. The configuration information on the first bit rate is included in a TCP option information.

A streaming service can be supported with a plurality of signaling transmissions and receptions skipped between a server and a client.

DETAILED DESCRIPTION

Figure 1:
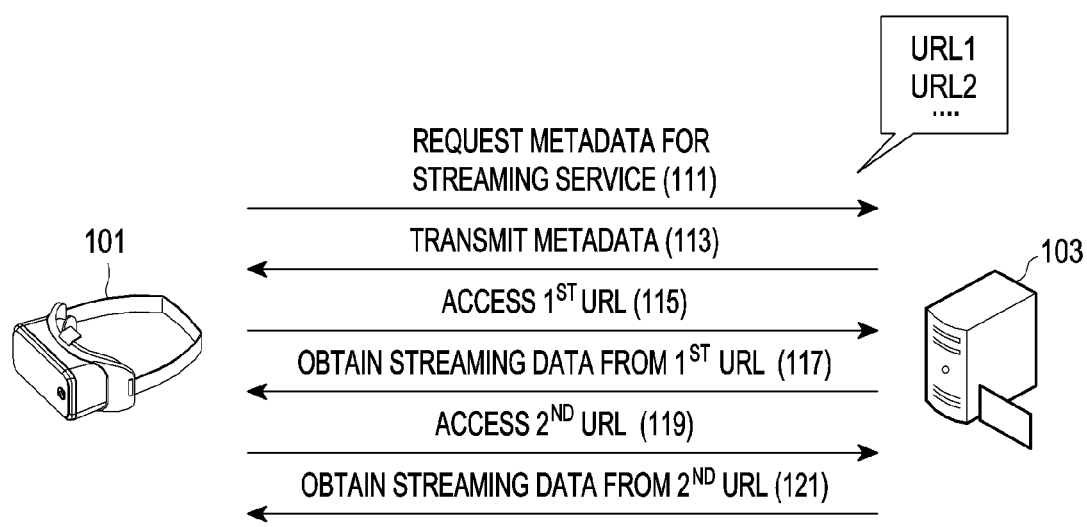
FIG. 1 is a diagram illustrating the sequence of a hypertext transfer protocol (HTTP)-based live streaming operation.

Embodiments of the present disclosure are described in detail with reference to the accompanying drawings. A detailed description of a generally known function or structure of the present disclosure will be avoided lest it should obscure the subject matter of the present disclosure. Although the terms used in the present disclosure are defined in consideration of functions in the present disclosure, the terms may be changed according to the intention of a user or an operator, or customs. Therefore, the definitions should be made, not simply by the actual terms used but by the meanings of each term lying within.

While the embodiments of the present disclosure are separately described below, for the convenience of description, two or more embodiments may be implemented in combination unless conflicting with each other.

The term as used in the present disclosure, $1^{st}$, $2^{nd}$ first or second may be used for the names of various components, not limiting the components. These expressions are used to distinguish one component from another component. For example, a first component may be referred to as a second component and vice versa without departing the scope of the disclosure Further, the terms used in the present disclosure are used just to describe particular embodiments, not limiting the present disclosure. Unless the context clearly dictates otherwise, singular forms include plural referents. In the present disclosure, the term "have", "may have", "include" or "may include" signifies the presence or probable addition of a feature, number, function, operation, component, or part, or a combination thereof, not excluding the presence or probable addition of one or more other features, numbers, functions, operations, components, or parts, or combinations thereof.

Adaptive hypertext transfer protocol (HTTP) streaming takes the advantages of both of progressive download and real time streaming protocol/real time messaging protocol (RTSP/RTMP) streaming. A server streams a video in units of a few seconds, and a user downloads and plays the video in units of the few seconds. In adaptive HTTP streaming, a streaming service may also be provided at a bit rate suitable for a bandwidth environment of a user based on the awareness of the bandwidth environment.

In the present disclosure, various types of data including video, audio, music, and subtitles (i.e., text) provided along with images may be provided in a streaming service. Further, the data that may be provided in the streaming service may also include virtual reality (VR) data provided by a VR device.

A client device is a device that requests a streaming service, and a streaming service is a device that provides the streaming service in the present disclosure. The client device and the streaming server may be distinguished from each other by their functionalities, not by their names. For example, if a computer requests a user-intended streaming service to another device, the computer may serve as a client device. If the computer provides the streaming service to another device, the computer may serve as a streaming server.

FIG. 1 is a diagram illustrating an exemplary sequence of an HTTP-based live streaming operation. The use of a streaming service by means of a VR device will be described below, which should not be construed as limiting the embodiments of the present disclosure.

Referring to FIG. 1, a VR device 101 may request metadata for a streaming service to a streaming server 103 in operation 111.

The streaming server 103 generates segments of streaming data to be provided in the requested streaming service, and transmits metadata including at least one uniform resource locator (URL) used to locate the segments to the VR device 101 in operation 113.

The VR device 101 accesses a first URL included in the metadata in operation 115.

The VR device 101 retrieves streaming data from the first URL and reproduces the streaming data in operation 117.

The VR device 101 accesses a second URL included in the metadata in operation 119.

The VR device 101 retrieves streaming data from the second URL and reproduces the streaming data in operation 121.

By the above procedure, the VR device 101 requests, retrieves, and reproduces streaming data sequentially.

Figure 2:
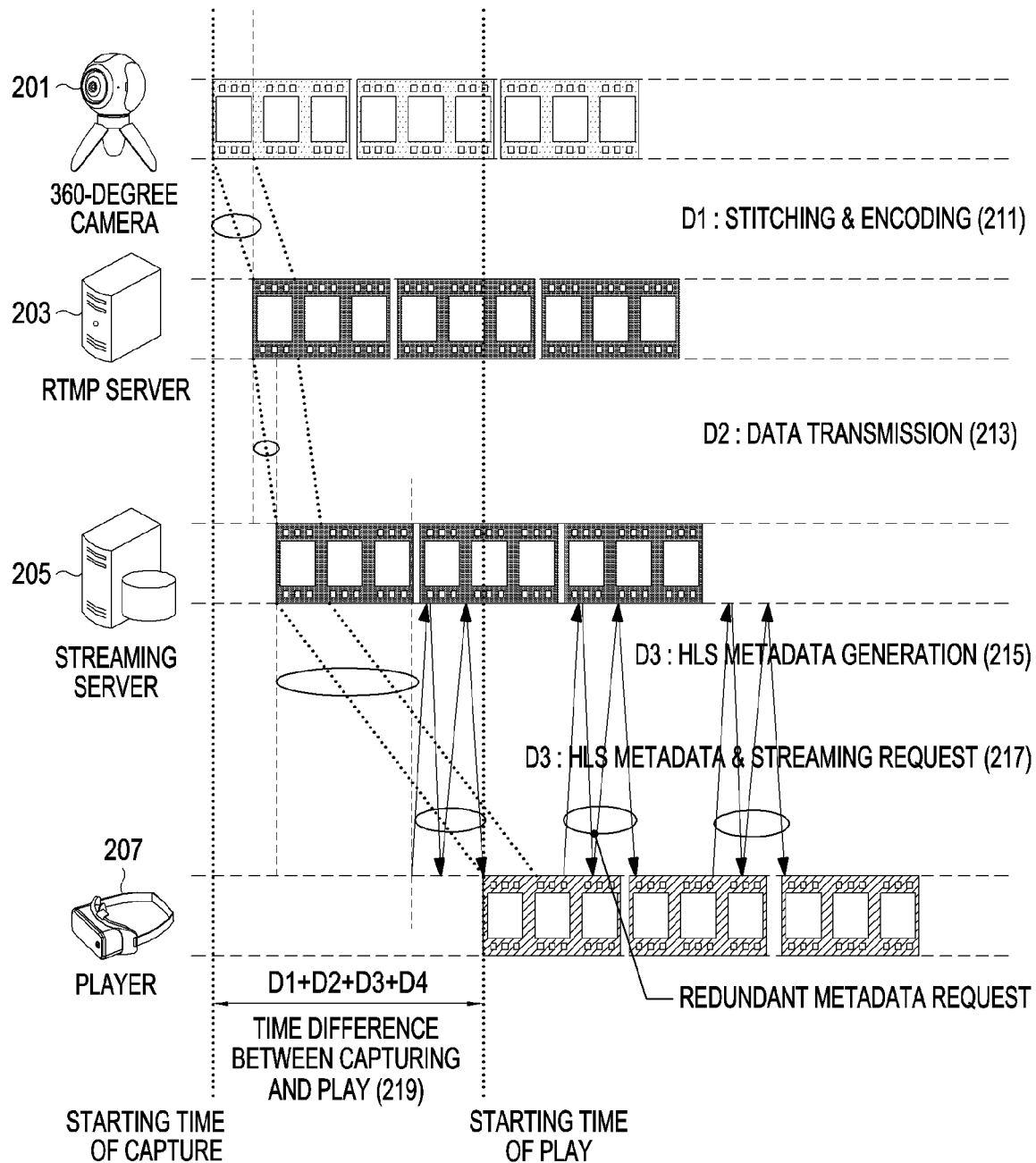
FIG. 2 is a diagram illustrating an exemplary real time messaging protocol (RTMP) streaming method that provides a streaming service, simultaneously with video capturing.

FIG. 2 is a diagram illustrating an exemplary RTMP streaming method that provides a streaming service, simultaneously with video capturing.

Referring to FIG. 2, a 360-degree camera 201 captures a video, stitches and encodes the video data, and transmits the stitched and encoded video data to an RTMP server 203. In view of the stitching and encoding, there is a time gap 211 between a time of receiving the video data by the RTMP server 203 and a time of capturing the video by the 360-degree camera 201. The time gap 211 is a processing time taken for the stitching and encoding.

The RTMP server 203 transmits the received video data to a streaming server 205. A transmission time 213 is taken for the transmission.

The streaming server 205 may adopt HTTP-based live streaming (HLS) to provide a streaming service. The HLS is a protocol available for HTTP-based live streaming.

When a player 207 requests the streaming service, the streaming server 205 generates HLS metadata (or metadata) before providing the streaming service. Herein, a processing time 215 is taken for the metadata generation. The player 207 determines a resolution, a bit rate, and so on based on the metadata and requests the streaming service. There is a time gap 217 between a time of checking the metadata by the player 207 and a time of requesting the streaming service by the player 207.

Therefore, a total time gap 219 being the sum of the time gaps 211, 213, 215, and 217 exists between the starting time of capturing the video by the 360-degree camera 201 and the starting time of playing the video by the player 207.

Figure 3A:
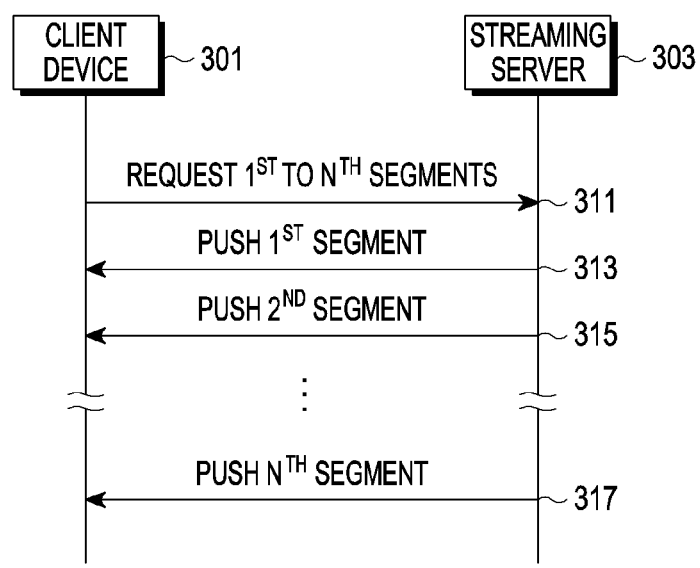
FIGS. 3A and 3B are diagrams illustrating a method of providing a streaming service by HTTP 2.0 push.
Figure 3B:
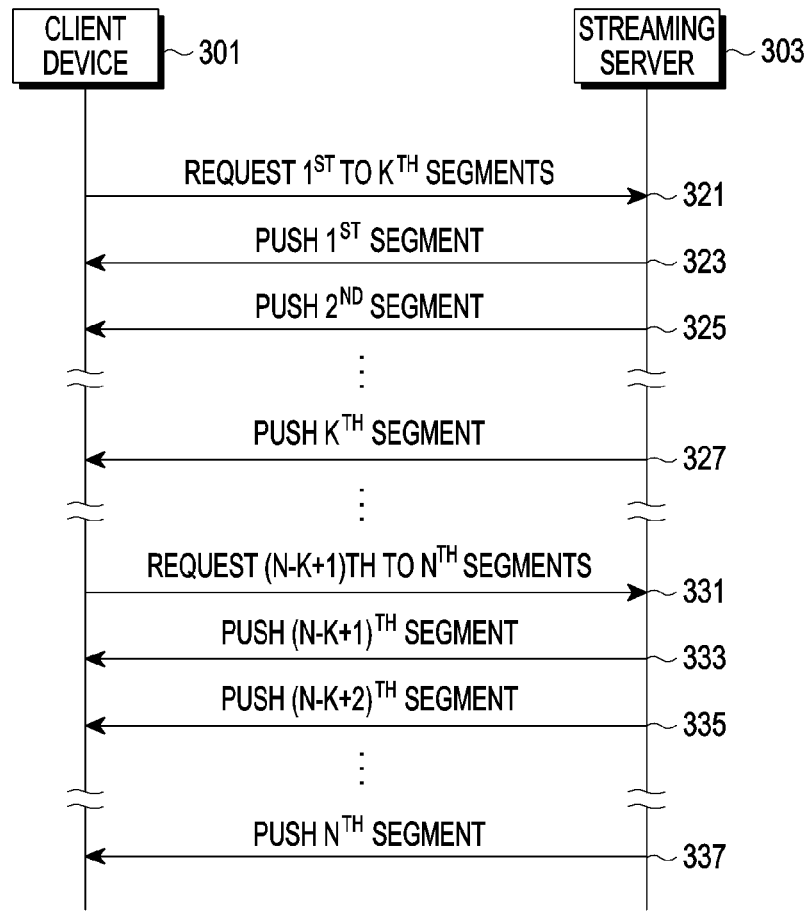

FIGS. 3A and 3B are diagrams illustrating a method of providing a streaming service by HTTP 2.0 push. Push means transmitting data to a client by a server. A client device 301 requests data (i.e., segments) to be provided in a streaming service to a streaming server 303. The client device 301 may request all or a part of the segments.

Referring to FIG. 3A, the client device 301 may request all of n segments to the streaming server 303 in operation 311. The streaming server 303 pushes the segments sequentially to the client device 301 in operations 313, 315, and 317.

Referring to FIG. 3B, the client device 301 may first request $1^{st}$ to $k^{th}$ ones of total n segments to the streaming server 303 in operation 321. The streaming server 303 pushes the $1^{st}$ to $k^{th}$ segments sequentially to the client device 301 in operations 323, 325, and 327. Upon receipt of all of the $1^{st}$ to $k^{th}$ segments, the client device 301 may request $(n-k+1)^{th}$ to $n^{th}$ segments in operation 331. The streaming server 303 pushes the $(n-k+1)^{th}$ to $n^{th}$ segments sequentially to the client device 301 in operations 333, 335, and 337.

Some of the requested segments may not have been generated yet from the streaming server. The streaming server, which has received the request, pushes generated segments directly to the client device, waits until the remaining yet-to-be generated segments are generated, and then pushes the remaining segments.

According to the HTTP 2.0 push scheme, the client device does not need to request individual segments one by one, thereby reducing requests to be transmitted to the streaming server.

Figure 4:
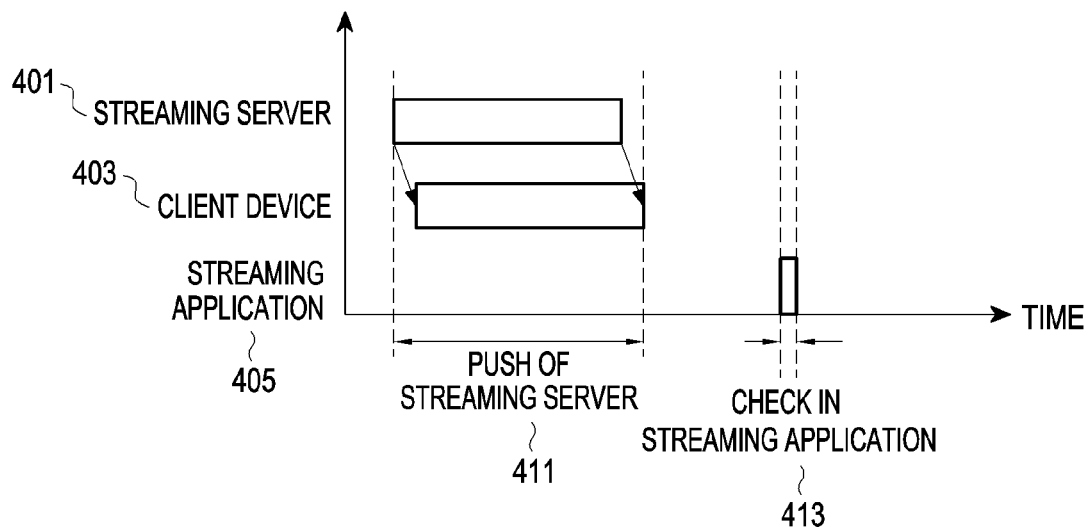
FIG. 4 is a diagram illustrating a speed evaluation operation in server push.

FIG. 4 is a diagram illustrating a speed evaluation operation in server push.

Referring to FIG. 4, when a streaming server 401 pushes data (i.e., segments) to a client device 403, the pushed segments are stored in a cache of the client device 403 in operation 411. Therefore, a streaming application 405 that provides the streaming service to a user in the client device 403 is not aware whether the segments have been pushed. When providing the streaming service, the streaming application 405 just checks the pushed segments in operation 413. Since the streaming application 405 does not have knowledge of a pushed time of a segment and pushed times of other segments, the streaming application 405 is not capable of calculating a network speed which is a key element in the streaming service.

Figure 5:
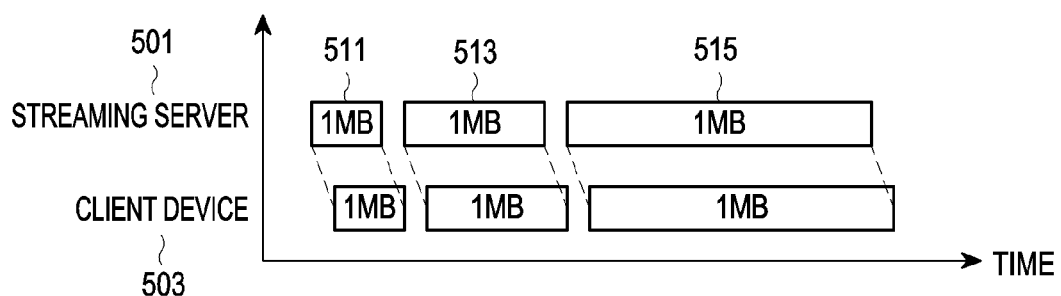
FIG. 5 is a diagram illustrating exemplary bit rate non-adjustment in server push.

FIG. 5 is a diagram illustrating exemplary bit rate non-adjustment in server push.

Referring to FIG. 5, when a client device 503 requests push of three segments 511, 513, and 515 to a streaming server 501, the streaming server 501 pushes the three segments 511, 513, and 515 at the same bit rate in spite of a decrease in a network speed. In real implementation, however, if the network speed decreases, the bit rate at which the segments 511, 513, and 515 are pushed should be changed such that the client device 503 may provide the streaming service normally to a user.

Figure 6:
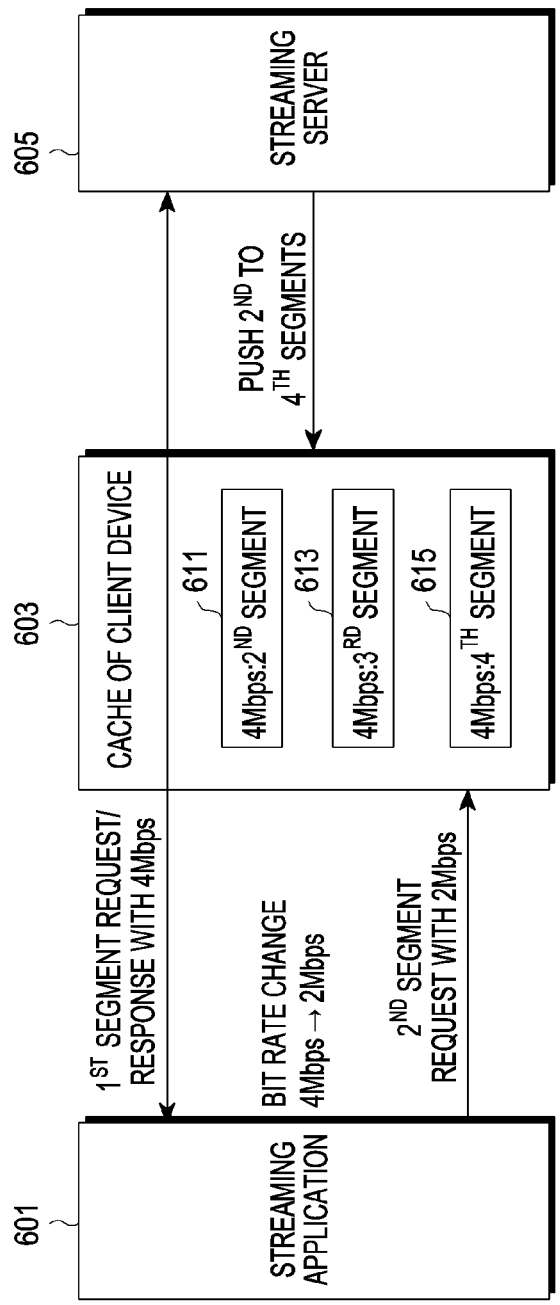
FIG. 6 is a diagram illustrating cache awareness during server push.

FIG. 6 is a diagram illustrating cache awareness during server push.

Referring to FIG. 6, when a streaming server 605 pushes a plurality of segments, for example, second to fourth segments 611, 613, and 615 to a client device, the client device stores the second to fourth segments in a cache 603 of the client device. Even though the client device changes the bit rate to a second bit rate and receives the fourth segment again from the streaming server 605, a streaming application 601 of the client device may not be aware of the state of the cache 603, which may result in the problem that the received fourth segment is reproduced at the first bit rate.

Moreover, since the streaming server 605 pushes the segments with no regard to the cache capacity of the client device, the client device may suffer from overload.

In embodiments of the present disclosure as described later, a live streaming mechanism using mutual layer operations based on TCP and HTTP is proposed. HTTP is used to transmit a request from an application for starting, pausing, resuming, or stopping streaming. In TCP, a TCP option in a TCP header of a packet carrying data for a streaming service is used to control a transmission bit rate, for network speed adjustment. Further, TCP parameters such as a reception window size, a congestion window size, a round trip time (RTT), and an interval between two packets may be used to optimize an adaptive algorithm. Accordingly, a low-latency live streaming protocol having high bit rate adaptation performance and low-repetition messages may be achieved.

Figure 7:
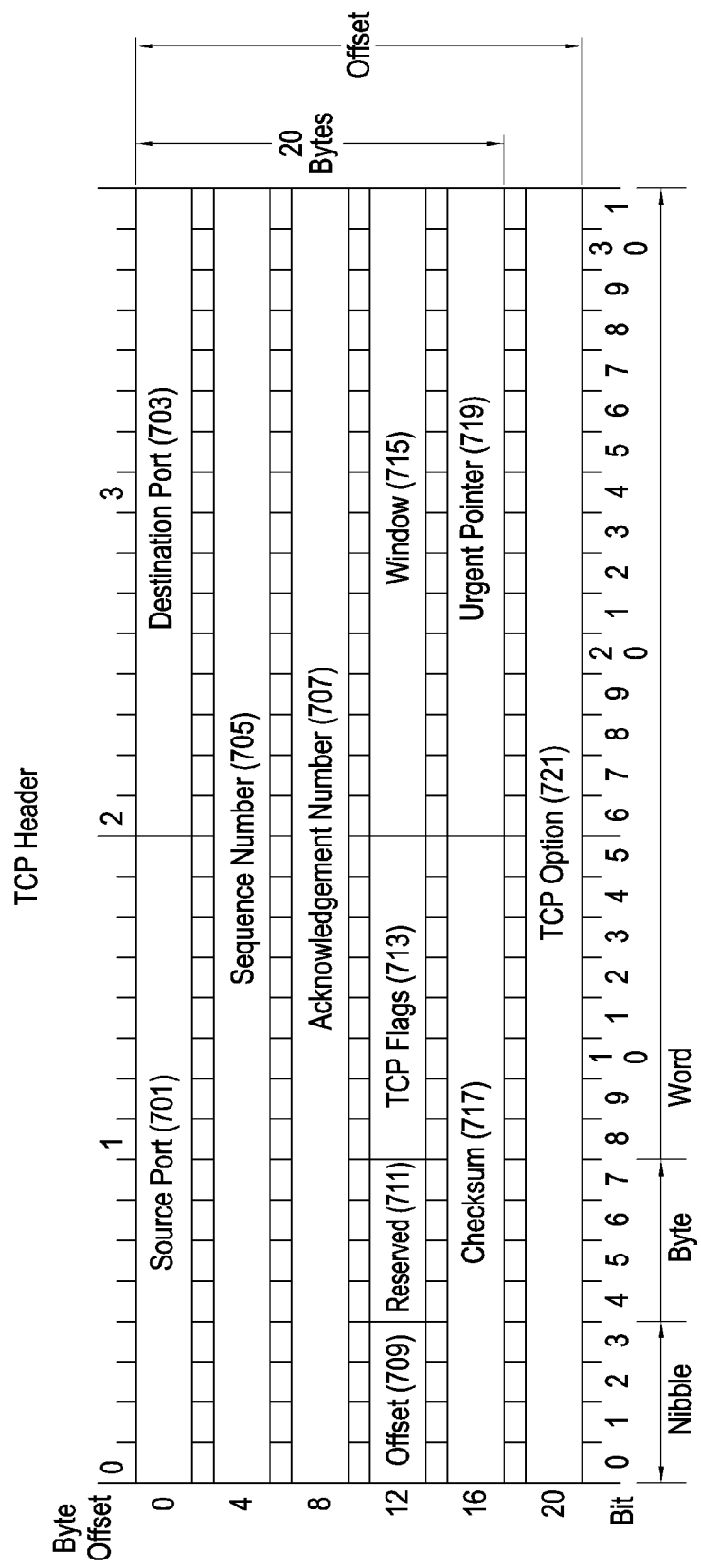
FIG. 7 is a diagram illustrating the format of a transmission control protocol (TCP) header included in a packet that carries data for a streaming service.

FIG. 7 is a diagram illustrating the format of a TCP header included in a packet carrying data for a streaming service.

Referring to FIG. 7, the TCP header includes a source port 701, a destination port 703, a sequence number 705, an acknowledgement number 707, an offset 709, reserved 711, TCP flags 713, a window 715, a checksum 717, an urgent pointer 719, and a TCP option 721.

The TCP option 721 includes the following three fields: Kind indicating the type of the option, Len indicating the length of the option, and Data containing data of the option. Specifically, if the streaming service is supported, the Kind field may indicate stream. The data field may be used for a user-specific purpose. For example, information about a bit rate at which the streaming service is supported may be included in the Data field. Or more than 200 reserved TCP options may be used. Because the Data field has a variable length, a valid length of the TCP option field may be indicated by the Len field.

Figure 8:
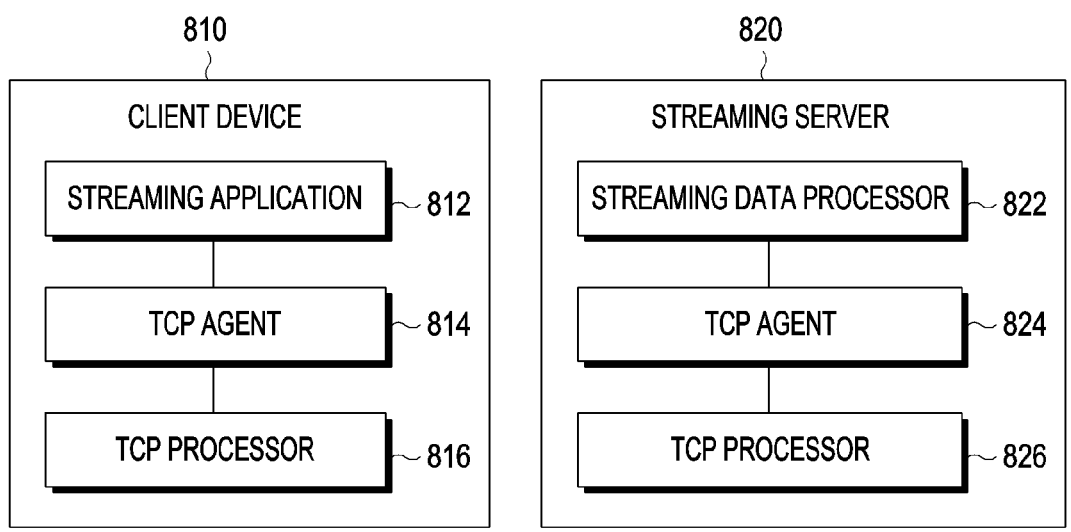
FIG. 8 is a block diagram of a client device and a streaming server according to an embodiment of the present disclosure.

FIG. 8 is a block diagram of a client device and a streaming server according to an embodiment of the present disclosure. For the convenience of description, components with no direct relation to the present disclosure will not be shown and described.

Referring to FIG. 8, a client device 810 may include a streaming application 812, a TCP agent 814, and a TCP processor 816. The streaming application 812 provides a streaming service to a user. The streaming application 812 may determine a bit rate of the streaming service. The streaming application 812 may indicate the determined bit rate to the TCP agent 814 via an application programming interface (API). The TCP agent 814 may configure a TCP option to be transmitted or detect a received TCP option. The TCP processor 816 transmits or receives a TCP packet. While the client device 810 is shown as divided into the plurality of components 812, 814, and 186, by way of example, the following operations may be performed by one component, when needed.

The streaming server 820 may include a streaming data processor 822, a TCP agent 824, and a TCP processor 826. The streaming data processor 822 may encode data to be provided to another device in the streaming service. The TCP agent 824 may configure a TCP option to be transmitted or detect a received TCP option. The TCP processor 826 transmits or receives a TCP packet. While like the client device 810, the streaming server 820 is shown as including the plurality of components 822, 824, and 826, by way of example, all of the following operations may be performed by one component, when needed.

With reference to FIGS. 9 to 12, each component will be described below in detail.

Figure 9:
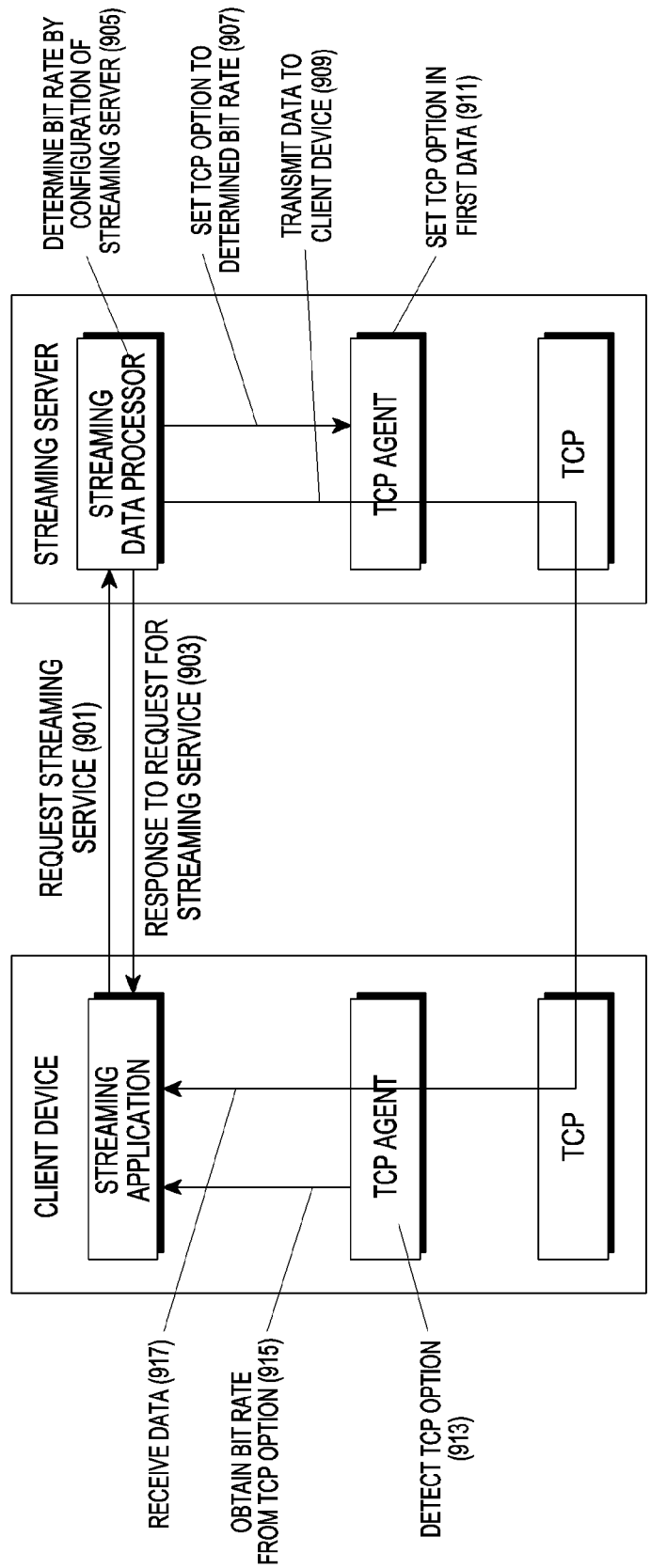
FIG. 9 is a flowchart illustrating an operation of providing a streaming service to a client device by a streaming server according to an embodiment of the present disclosure.

FIG. 9 is a flowchart illustrating an operation of providing a streaming service to a client device by a streaming server according to an embodiment of the present disclosure.

Referring to FIG. 9, upon receipt of a request for the streaming service from a user, the client device transmits a request for the streaming service to the streaming server in operation 901.

The streaming server transmits a response to the request for the streaming service to the client device in operation 903. The response may include metadata. The metadata may include information about the resolution, bit rate, and codec ID of data to be provided in the streaming service, and so on. For example, the metadata may include information about various bit rates supported by the streaming server.

While the following description is given in the context of bit rate, the following description is also applicable to resolution, codec ID, and so on.

The bit rate of the data to be provided in the streaming service may be determined according to a configuration of the streaming server in operation 905. Or the bit rate may be determined according to a request of the client device. Or the streaming server may determine the bit rate by determining the state of the network in real time.

The streaming server sets the Data field of a TCP option to a bit rate determined before data transmission in operation 907. The streaming server may use an API to configure the TCP option.

After transmitting the metadata, the streaming server transmits the data to be provided in the streaming service to the client device in operation 909. The streaming server may transmit the data in an existing TCP session without establishing a new TCP session. The streaming server may set the same TCP option only in the first (segment or packet) of the data to be provided in the streaming service in order to save a bandwidth in operation 911. Or the streaming server may configure the same TCP option in a plurality of data (segments or packets).

The client device receives a data packet from the streaming server, and detects a TCP option included in the data packet in operation 913. The client device may analyze the TCP option, and store information of the TCP option, when needed. The information of the TCP option may include the bit rate of the data packet.

The client device may obtain or identify the bit rate of the data transmitted by the streaming server from the analysis result of the TCP option in operation 915.

After storing the information of the TCP option, the client device continuously receives data packets from the streaming server in operation 917.

In an embodiment, the client device and the streaming server may transmit a request for starting, pausing, resuming, or stopping a streaming service by HTTP, and a request for changing a bit rate by a TCP option.

While it has been described that the above operations are performed in order, a plurality of operations may also be performed at the same time. For example, the client device may identify the bit rate of data transmitted by the streaming server by analyzing the TCP option, simultaneously with detecting the TCP option.

Figure 10:
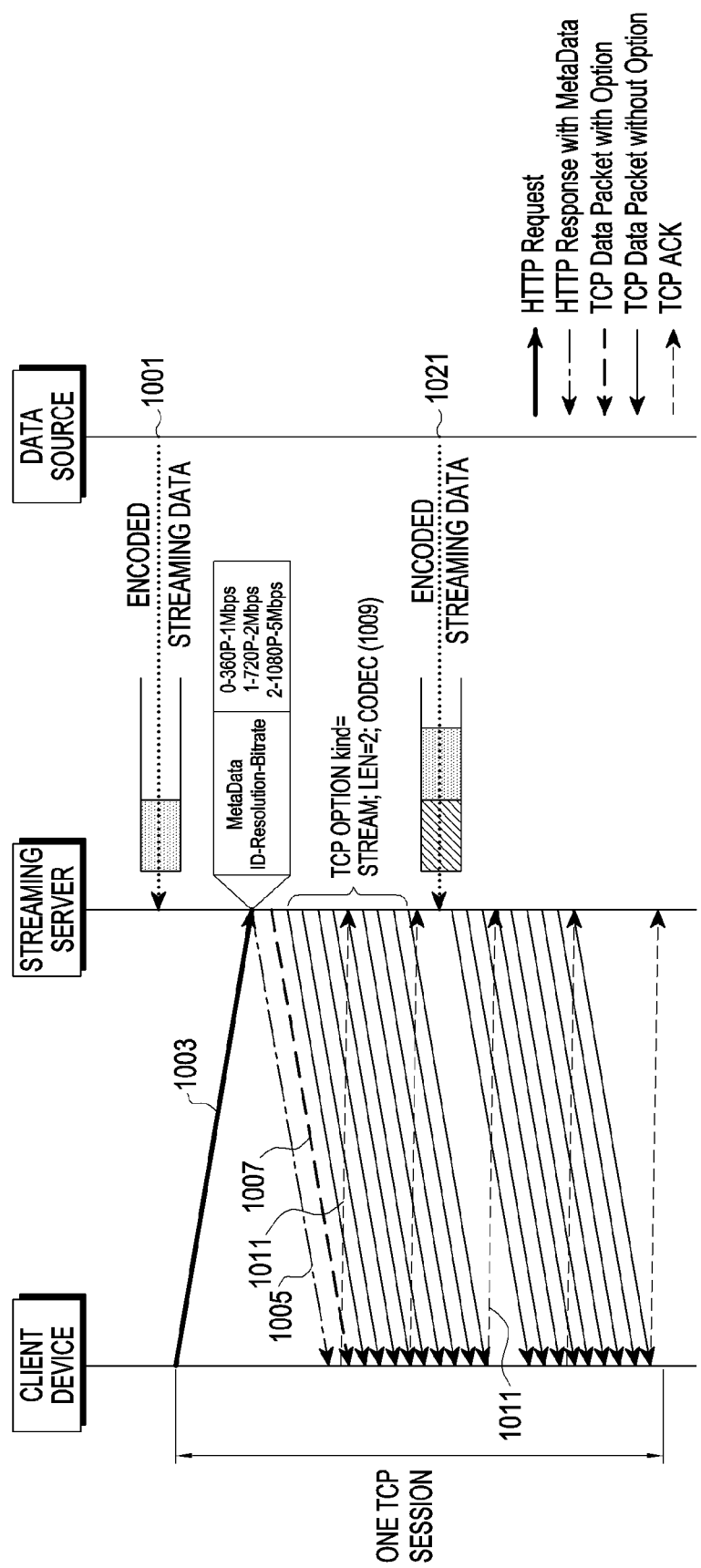
FIG. 10 is a flowchart illustrating an operation of providing a streaming service to a client device by a streaming server from the perspective of data according to an embodiment of the present disclosure.

FIG. 10 is a flowchart illustrating an operation of providing a streaming service to a client device by a streaming server, from the perspective of data, according to an embodiment of the present disclosure.

Specifically, FIG. 10 illustrates an exemplary operation of receiving data from an additional data source, for example, a camera and transmitting the data to a client device by a streaming server, instead of transmitting data stored in a memory of the streaming server to the client device.

Referring to FIG. 10, the camera may transmit encoded streaming data periodically or aperiodically to the streaming server in operations 1001 and 1021.

The client device transmits a request for the streaming service to the streaming server in operation 1003.

The streaming server transmits metadata in response to the request for the streaming service in operation 1005.

The streaming server sets a TCP option to a predetermined bit rate, and transmits data for the requested streaming service to the client device in operation 1007. For example, the bit rate set in the TCP option may be a predetermined default value.

The streaming server transmits all of data for the requested streaming service, stored in the streaming server in operation 1009. The streaming server maintains a TCP session.

The client device periodically transmits an acknowledgement or a negative acknowledgement for the data received from the streaming server in operation 1011.

Subsequently, upon receipt of additional encoded streaming data from the camera, the streaming server transmits the received additional encoded streaming data to the client device in the maintained TCP session.

In the embodiment of the present disclosure, therefore, as the TCP session is maintained, there is no need for an additional request/response between the client and the streaming server, and thus RTT latency is not generated. Further, because it is not necessary to generate a new TCP session or update the TCP session, no starting-related latency is incurred.

Figure 11:
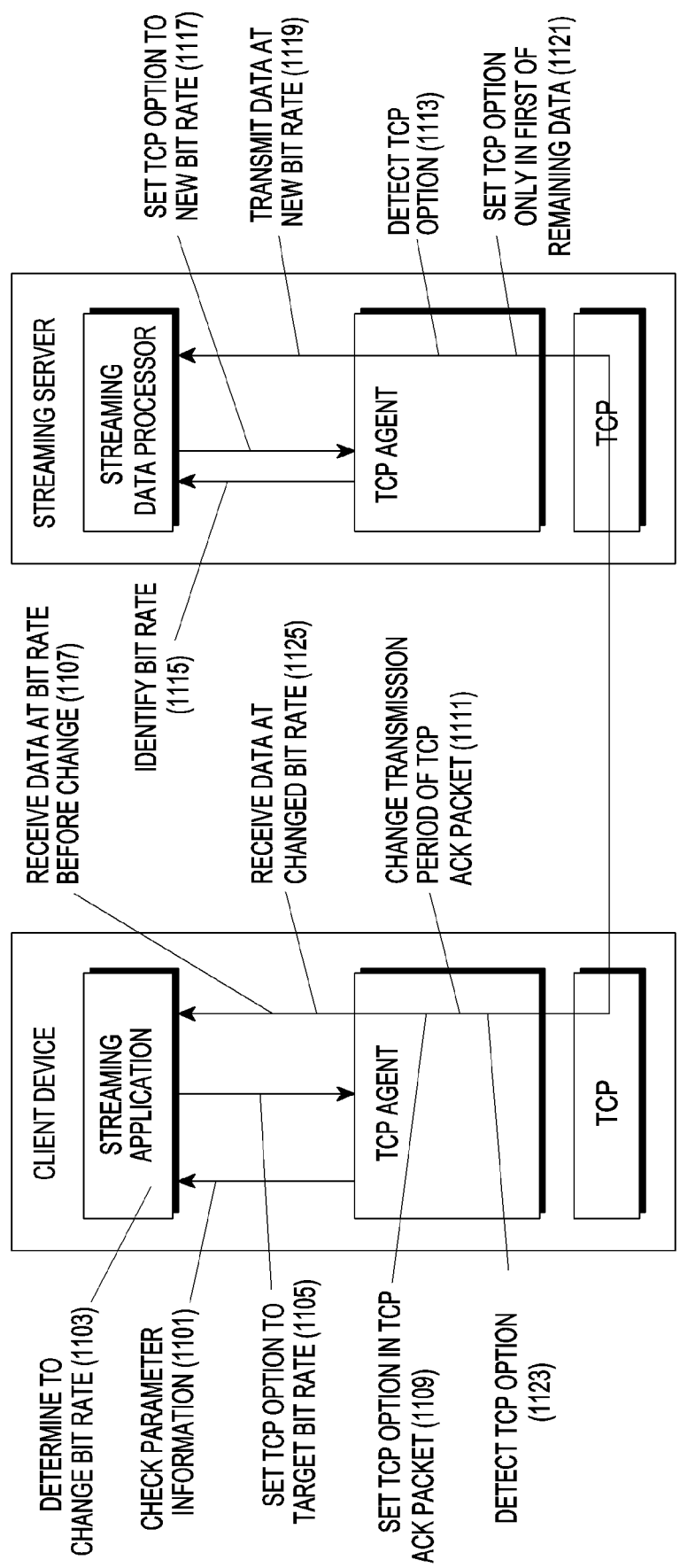
FIG. 11 is a flowchart illustrating an operation of changing a bit rate during a streaming service in progress according to an embodiment of the present disclosure.

FIG. 11 is a flowchart illustrating an operation of changing a bit rate during a streaming service in progress according to an embodiment of the present disclosure.

Referring to FIG. 11, a client device checks parameter information for an on-going streaming service in operation 1101. The parameter may be bit rate information set in a TCP option of a received packet. Other parameters including a reception window size, a congestion window size, an RTT, and an interval between two packets may be obtained from the TCP option.

The client device may determine to change the bit rate of the on-going streaming service in operation 1103. For example, if the client device simultaneously executes a function other than the streaming service, the client may determine to decrease the bit rate. Or when the client completes an operation other than the streaming service during simultaneous execution of the operation and the streaming service, the client may determine to increase the bit rate. Besides, the client device may determine to change the bit rate by autonomously evaluating a TCP link speed and a network state. For example, the client device may determine a target bit rate by using at least one of TCP parameters such as a reception window size, a congestion window size, an RTT, and an interval between two packets. Further, the client device may determine a time when the bit rate is to be changed.

When the client device determines to change the bit rate, the client device sets a TCP option to the target bit rate in operation 1105.

Even though the client device determines to change the bit rate, the client device may continue receiving data from the streaming server at the bit rate which has not been changed yet in operation 1107.

The client device sets the TCP option in a TCP ack packet in operation 1109.

To fast change the bit rate, the client device may transmit the TCP ack packet by changing the transmission period of the TCP ack packet in operation 1111.

Upon receipt of the TCP ack packet, the streaming server detects the TCP option in operation 1113.

The streaming server identifies the new bit rate from the detected TCP option in operation 1115. The streaming server may identify the new bit rate via an API.

The streaming server sets a TCP option to the new bit rate in operation 1117.

The streaming server transmits the remaining data packets at the new bit rate to the client device in operation 1119.

The streaming server may set the new bit rate of the TCP option only in the first of the remaining data packets (or a predetermined number of data packets among the remaining data packets) in operation 1121. In an embodiment, the previous bit rate may be set for data packets following the first data packet. Or the streaming server may set the TCP option of the new bit rate in the remaining data packets.

The client device detects the TCP option set by the streaming server from a received data packet in operation 1123. The client device may identify that the bit rate has been changed from the detected TCP option. Then, the client device may recover the transmission period of a TCP ack packet to an original one.

The client device receives data at the changed bit rate from the streaming server in operation 1125.

Figure 12:
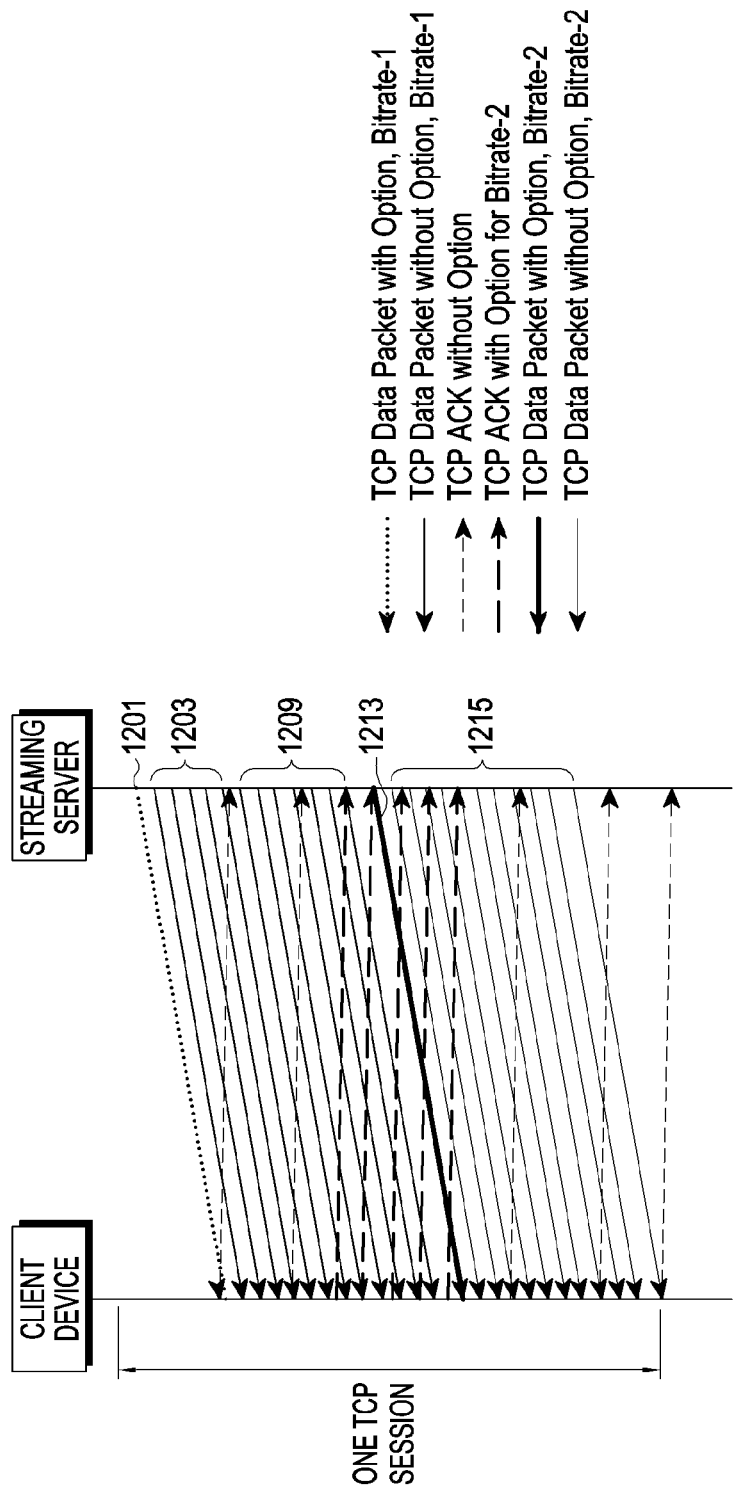
FIG. 12 is a diagram illustrating a data flow in the case where a bit rate is changed during a streaming service in progress according to an embodiment of the present disclosure.

FIG. 12 is a diagram illustrating a data flow in the case where a bit rate is changed during a streaming service in progress according to an embodiment of the present disclosure.

Referring to FIG. 12, a streaming server provides the streaming service at a first bit rate to a client device in operation 1201.

Subsequently, the streaming server continues providing the streaming service at the first bit rate in operation 1203.

The client device transmits a TCP ack packet in every predetermined period to the streaming server in operation 1205.

The client device may determine to change the first bit rate to a second bit rate. Having determined to change the first bit rate to a second bit rate, the client device may set a TCP option to the second bit rate. Then, the client device sets the TCP option in a TCP ack packet and transmits the TCP ack packet in operation 1207.

The streaming server, which has not received the TCP ack packet with the TCP option set therein yet, continues providing the streaming service at the first bit rate to the client device in operation 1209.

Because the client device receives the streaming service at the first bit rate, the client device often transmits the TCP ack packet in operation 1211.

Upon receipt of the TCP ack packet with the TCP option set therein, the streaming server provides the streaming service by setting the TCP option in order to indicate to the client device that the streaming service is provided at the second bit rate in operation 1213.

Subsequently, the streaming server continues providing the streaming service at the second bit rate in operation 1215.

The client device may identify that the streaming service is being provided at the second bit rate by checking the TCP option set by the streaming server. The client device transmits a TCP ack packet with a previous periodicity in operation 1217.

According to the embodiment of the present disclosure, even when the bit rate of the streaming service is changed, the TCP session is maintained, thereby obviating the need for an additional request/response between the client and the streaming server. Thus, there is no RTT latency. Further, since it is not necessary to generate a new TCP session or update the TCP session, no starting-related latency occurs.

Specific aspects of the disclosure may be implemented as a computer-readable code in a computer-readable recording medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve the present disclosure.

Further, the apparatus and method according to an embodiment of the disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as CD, DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to an embodiment of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method of supporting a streaming service by a terminal, comprising:
   requesting a streaming service to a server;
   receiving metadata related to the streaming service from the server;
   receiving first information for the streaming service based on a first bit rate, wherein the first information includes a first transmission control protocol (TCP) option information including first configuration information on the first bit rate;
   transmitting, to the server, first acknowledgement at first acknowledgement cycle in response to receiving the first information for the streaming service;
   receiving, from the server, second information for the streaming service based on the first bit rate;
   determining whether to change the first bit rate; and
   if the terminal determines to change the first bit rate to a second bit rate, changing the first acknowledgement cycle to second acknowledgement cycle and transmitting, to the server, second acknowledgement including a second TCP option information at the second acknowledgement cycle in response to receiving the second information for the streaming service,
   wherein the second TCP option information includes a second configuration information on the second bit rate, and
   wherein the second acknowledgement cycle is shorter than the first acknowledgement cycle.

2. The method of claim 1, wherein the first TCP option information includes a kind field information indicating a type of the TCP option, a len field information indicating a length of the TCP option, and a data field information comprising configuration information on a bit rate for supporting the streaming service.

3. The method of claim 1, wherein the requesting of the streaming service, the receiving of the metadata, and the receiving of the first information for the streaming service are performed in one TCP session.

4. The method of claim 1, further comprising:
   receiving, from the server, third information for the streaming service based on the second bit rate; and
   transmitting, to the server, third acknowledgement at the first acknowledgement cycle in response to receiving the third information for the streaming service.

5. The method of claim 1, further comprising:
   receiving, from the server, third information for the streaming service including a third TCP option information;
   determining whether the third TCP option information comprises a third configuration information on the second bit rate; and
   if the third TCP option information does not comprise the third configuration information on the second bit rate, transmitting, to the server, third acknowledgement including a fourth TCP option information, wherein the fourth TCP option information includes fourth configuration information on the second bit rate.

6. A method of supporting a streaming service by a server, comprising:
   receiving a request for a streaming service from a terminal;
   transmitting metadata related to the streaming service to the terminal; and
   transmitting, to the terminal, first information for the streaming service based on a first bit rate,
   wherein the first information includes a first transmission control protocol (TCP) option information including first configuration information on the first bit rate;
   receiving, from the terminal, first acknowledgement at first acknowledgement cycle in response to transmitting the first information for the streaming service;
   transmitting, to the terminal, second information for the streaming service based on the first bit rate; and
   if the server receives, from the terminal, second acknowledgement including a second TCP option information at second acknowledgement cycle in response to transmitting the second information for the streaming service, identifying second configuration information on a second bit rate in the second TCP option information and transmitting, to the terminal, third information for the streaming service based on the second bit rate,
   wherein the second acknowledgement cycle is shorter than the first acknowledgement cycle.

7. The method of claim 6, wherein the first TCP option information includes a kind field information indicating a type of the TCP option, a len field information indicating a length of the TCP option, and a data field information comprising configuration information on a bit rate for supporting the streaming service.

8. The method of claim 6, wherein the receiving of the request, the transmitting of the metadata, and the transmitting of the first information for the streaming service are performed in one TCP session.

9. A terminal for supporting a streaming service, comprising:
   a transceiver; and
   a processor configured to:
      request a streaming service to a server,
      control the transceiver to receive metadata related to the streaming service from the server,
      control the transceiver to receive first information for the streaming service based on a first bit rate, wherein the first information includes a first transmission control protocol (TCP) option information including first configuration information on the first bit rate,
      control the transceiver to transmit, to the server, first acknowledgement at first acknowledgement cycle in response to receiving the first information for the streaming service,
      control the transceiver to receive, from the server, second information for the streaming service based on the first bit rate,
      determine whether to change the first bit rate, and
      if the terminal determines to change the first bit rate to a second bit rate, change the first acknowledgement cycle to second acknowledgement cycle and control the transceiver to transmit, to the server, second acknowledgement including a second TCP option information at the second acknowledgement cycle in response to receiving the second information for the streaming service,
      wherein the second TCP option information includes second configuration information on the second bit rate, and
      wherein the second acknowledgement cycle is shorter than the first acknowledgement cycle.

10. The terminal of claim 9, wherein the first TCP option information includes a kind field information indicating a type of the TCP option, a len field information indicating a length of the TCP option, and a data field information comprising configuration information on a bit rate for supporting the streaming service.

11. The terminal of claim 9, wherein the processor is configured to perform the requesting of the streaming service, the receiving of the metadata, and the receiving of the first information for the streaming service in one TCP session.

12. The terminal of claim 9, wherein the processor is further configured to:
control the transceiver to receive, from the server, third information for the streaming service based on the second bit rate, and
control the transceiver to transmit, to the server, third acknowledgement at the first acknowledgment cycle in response to receiving the third information for the streaming service.

13. The terminal of claim 9, wherein the processor is further configured to:
control the transceiver to receive, from the server, third information for the streaming service including a third TCP option information;
determine whether the third TCP option information comprises a third configuration information on the second bit rate; and
if the third TCP option information does not comprise the third configuration information on the second bit rate, control the transceiver to transmit, to the server, third acknowledgement including a fourth TCP option information, wherein the fourth TCP option information includes fourth configuration information on the second bit rate.

14. A server for supporting a streaming service, comprising:
a transceiver; and
a processor is configured to:
control the transceiver to receive a request for a streaming service from a terminal,
control the transceiver to transmit metadata related to the streaming service to the terminal, and
control the transceiver to transmit, to the terminal, first information for the streaming service based on a first bit rate, wherein the first information includes a first transmission control protocol (TCP) option information including first configuration information on the first bit rate,
control the transceiver to receive, from the terminal, first acknowledgement at first acknowledgement cycle in response to transmitting the first information for the streaming service,
control the transceiver to transmit, to the terminal, second information for the streaming service based on the first bit rate,
if the server receives, from the terminal, second acknowledgement including a second TCP option information at second acknowledgement cycle, identify second configuration information on a second bit rate in the second TCP option information and control the transceiver to transmit, to the terminal, third information for the streaming service based on the second bit rate,
wherein the second acknowledgement cycle is shorter than the first acknowledgement cycle.

15. The server of claim 14, wherein the first TCP option information includes a kind field information indicating a type of the TCP option, a len field information indicating a length of the TCP option, and a data field information comprising configuration information on a bit rate for supporting the streaming service.

16. The server of claim 14, wherein the processor is configured to perform the receiving of the request, the transmitting of the metadata, and the transmitting of the first information for the streaming service in one TCP session.

* * * * *